United States Patent [19]

Blackmon, Sr.

[11] 4,168,987

[45] Sep. 25, 1979

[54] ASPHALTIC COMPOSITION COMPRISING ASPHALT PRIMER, ASPHALT COATING AND ASPHALT SEALER

[76] Inventor: John O. Blackmon, Sr., P.O. Box 954, Paris, Tex. 75460

[21] Appl. No.: 790,050

[22] Filed: Apr. 22, 1977

Related U.S. Application Data

[63] Continuation-in-part of Ser. No. 646,323, Jan. 2, 1976, abandoned.

[51] Int. Cl.$^2$ ............................................. C08L 95/00
[52] U.S. Cl. ................................... 106/278; 106/279; 208/23
[58] Field of Search ...................... 106/273, 278, 279; 208/22, 23

[56] References Cited

U.S. PATENT DOCUMENTS

| 2,158,771 | 5/1939 | Beckwith | 106/273 R |
|---|---|---|---|
| 2,415,697 | 2/1947 | Knowles et al. | 106/273 R |
| 2,596,323 | 5/1952 | Asaff | 106/278 |
| 2,783,163 | 2/1957 | Mollring | 106/273 X |
| 3,074,807 | 1/1963 | Dorius et al. | 106/273 R |
| 3,434,851 | 3/1969 | Miller | 106/278 |
| 3,574,652 | 4/1971 | Alexander et al. | 106/281 X |

OTHER PUBLICATIONS

Abraham, Asphalts and Allied Substances, 5th Ed., vol. 1, 1945, pp. 250–251.
The Asphalt Handbook, Jul. 1962 Ed., 2nd Printing, Mar. 1963, Manual Series No. 4, pp. 7, 8, 438–441.

*Primary Examiner*—Allan Lieberman
*Attorney, Agent, or Firm*—Warren H. Kintzinger

[57] ABSTRACT

An asphaltic coating and sealing substance comprised of a mixture of asphalt primer, asphalt coating, and asphalt sealer compounds, each of which comprises a specific asphalt base material mixed with a specified solvent. The resulting substance possesses desired individual properties of penetration, bonding, sealing, and set-up times to provide an effective single product particularly useful for one-step gravel roof rejuvination.

3 Claims, No Drawings

ASPHALTIC COMPOSITION COMPRISING ASPHALT PRIMER, ASPHALT COATING AND ASPHALT SEALER

This application is a continuation-in-part of my now abandoned application Ser. No. 646,323 filed Jan. 2, 1976.

This invention relates in general to new compositions of matter, and in particular to a mixture of substances particularly useful in sealing, restoration and deterioration prevention of gravel roofs.

Gravel roofs comprise an underlayer of felt material, such as tar paper, over which is spread a layer of gravel. Various asphaltic sealer and bonding agents are used to seal the felt to the roof surface, and bond the overlaying gravel to the felt, to the end of providing a water-tight roof surface.

Prolonged exposure to hot sun and changing weather conditions cause the gravel roof to deteriorate. Small pin holes and cracks develop as the felt underlayer dries out and the roof is no longer water-tight. Thus, gravel roofs need to be periodically resealed to retain the necessary sealing capability. Generally, this renovation process involves removing the gravel with subsequent application of a penetrating asphaltic substance to the felt underlay to resaturate the felt. The gravel is then respread and bonded to the roof by application of a still further asphaltic product, followed in some instances by application of a still further asphaltic sealer to complete the rejuvenation process.

The above-described multistep process is extremely expensive and time-consuming. No one asphaltic substance is known that may be used by itself to restore a gravel roof. Products available for felt penetration lack bonding qualities, while products useful in bonding lack penetration qualities. Use of various asphaltic substances in rejuvenation of gravel roofs in processes involving gravel removal and respreading is tantamount to, in essence, the installation of a new roof in terms of time and cost, rather than on effective rejuvenation and restoration of an existing roof.

It is, therefore, a principle object of this invention to provide an improved asphaltic substance useful in rejuvenation and preservation of existing gravel roofs.

Another object of the invention is to provide a single asphaltic substance for application to an existing gravel roof, which penetrates the gravel, resaturates the felt underlayer, and waterproofs, in a single application.

A further object of the invention is to provide a gravel roof treating substance for periodic application to the gravel surface of an existing gravel roof to provide felt underlay resaturation, gravel bonding, and moisture-proof sealing, to extend the roof life indefinitely, by application to the existing roof surface.

The preferred embodiment, useful in accomplishing the above objects, comprises a mixture of three different types of asphaltic bases in a combination of solvents. The three ingredients of the mixture to be defined are commercially available as respective asphaltic materials mixed thoroughly with certain solvents, and known as asphalt primer, asphalt coating and asphalt sealer, respectively.

Ingredient #1 comprises a 50% asphalt-50% solvent mixture by weight. The mixture consists of a 100% oxidized asphalt with a base softening point of 140°–160° F., and a penetration at 77° F. of 20–40. The solvent used has the following characteristics:

|  | API Gravity | 55.3 |
|---|---|---|
|  | Specific Gravity | .7575 |
|  | Reed Vapor Pressure | 1.0 psi |
|  | Flash Point TOC | 115° F. |
|  | Boiling Range | 230° 370° |
| Chemical Structure: | $C_5H_{12}$ through $C_{10}H_{22}$ straight chain (paraffins), free of aromatics and olefins, 100% saturated molecules, average molecular weight - 114.144. | |
| Distillation Data: | Initial Boiling Point - 100° F. | 50%–274° F. |
|  | 5%–110 | 60%–278 |
|  | 10%–120 | 70%–282 |
|  | 20%–268 | 80%–286 |
|  | 30%–270 | 90%–296 |
|  | 40%–272 | End Point 354— |

No coal tars or coal tar solvent are present in the resultant finished mixture. Ingredient #1, as here defined, is an asphalt primer, useful, in itself, for its bonding quality to gravel, stone, and concrete. Ingredient #1 may comprise a product, identified as Talcote Asphalt Primer 041, commercially available from American Petrafina of Mt. Pleasant, Texas. This substance alone would waterproof a gravel roof for a short period of time (i.e., six months) but does not possess long lasting waterproof qualities. While having ample penetration qualities, it lacks sufficient base for long life.

Ingredient #2 comprises an asphalt/solvent mixture consisting of 62%-minimum-67%-maximum asphalt by weight. The asphalt base properties of this mixture are: softening point of 155°–165° F., and penetration at 77° F. of 30–37. The solvent is the same as that above-described for ingredient #1. Ingredient #2, as here defined, is an asphalt coating material, about four times thicker than Ingredient #1, above. Ingredient #2 is useful, in itself, in spreading over a non-gravel smooth roof and has only a small tendency to penetrate the felt underlay. Ingredient #2 may comprise a product, identified as Talcote Unifibered Asphalt Roof Coating 010, commercially available from American Petrafina of Mt. Pleasant, Texas.

Ingredient #3 comprises an asphalt/solvent mixture consisting of Gilsonite Asphalt with a softening point of 230° F. and penetration at 77° F. of 3. The Gilsonite Asphalt is blended with a solvent, to give a mixture having the following general properties:

| Specific gravity at 60/60° F. | −0.8420 |
|---|---|
| Weight per gallon | −7.01 lbs. |
| Viscosity at 80° F. (#4Ford Cup) | −5 sec. |
| Drying Time - 1 mil dry |  |
| Dry Touch | −6.0 Min. |
| Dry Tack Free | −15.0 Min. |
| Dry Hard | −24.0 Hrs. |
| Non-Volatile | −38% |

The solvent for ingredient #3 has the following characteristics:

|  | API Gravity | 48.3 |
|---|---|---|
|  | Specific Gravity | .7870 |
|  | Reed Vapor Pressure | 1.3 psi |
|  | Flash Point TOC | 78° F. |
|  | Boiling Range | 340°–380° F. |
| Chemical Structure: | $C_9H_{20}$ through $C_{11}H_{24}$ straight chain (paraffins) hydrocarbons, free of aromatics and olefins, 100% saturated molecules, average | |

-continued

| Distillation Data: | molecular weight - 142.176.<br>Initial Boiling POint 320° F. | |
|---|---|---|
| | 5% 338 | 50% 358° F. |
| | 10% 340 | 60% 362 |
| | 20% 346 | 60% 366 |
| | 30% 350 | 80% 370 |
| | 40% 354 | 90% 378 |
| | | 100% 398° F. |

Ingredient #3, as here defined, is an asphalt sealer, useful, in itself, in sealing asphaltic surfaces such as parking areas, and may comprise a product, identified as Tolcote Driveway Topping 060, commercially available from American Petrafina of Mt. Pleasant, Texas. Ingredient #3 comprises a high percentage of Gilsonite Asphalt, regarded as the only pure asphalt on the market, and possesses important qualities useful in the final asphaltic coating mixture to be described. Ingredient #3 dries rapidly, and causes the final coating mixture to set up faster for increased effectiveness. Gilsonite Asphalt is extremely tacky and possesses strength qualities which reinforce the final coating mixture to contribute to long life. Additionally, Gilsonite Asphalt has a glossy finish to enhance the appearance of the finished roof.

In accordance with the present invention, a unique roof coating material is realized from combining the above-described Ingredients #1, #2, and #3 into the following mixture, based on a 100-gallon formula:

| Ingredient #1 | 72.73 gallons |
|---|---|
| Ingredient #2 | 18.18 gallons |
| Ingredient #3 | 9.09 gallons | of leakage through its inherent ability to remain less viscous, which in turn enables it to enter small, normally hard-to-seal leakage sources. It possesses penetration qualities for restoration of dried and cracked felt underlay, bonding qualities for strength, long life qualities for extended sealing effectiveness, and dries to a glossy, attractive finish.

The gravel roof coating mixture herein described possesses the unique ability to dry to a tacky finish which adheres to masonary surfaces, other coatings, mastics, iron, steel, and other materials—while remaining resistant to acids and alkalies. The properties of adherency make the coating mixture herein described useful as a metal preservative and/or as a coating for underground metal pipe line, soil pipe line, or cast iron pipe line with, or without, wrapping.

The mixture of ingredients #1, #2, and #3, and the specific ingredients and properties thereof, as set forth herein, are by way of a preferred embodiment. It is to be realized that the percentages of ingredients set forth and specific ingredient and mixture properties may vary with a ±15% range from those set forth without substantially detracting from the overall utilitarian aspects of the resulting roof coating substance as set forth in the teachings hereof.

Whereas, this invention is herein described with respect to a preferred embodiment, it should be realized that various changes may be made without departing from essential contributions to the art made by the teachings hereof.

1. A pre-combined three component asphaltic composition for single application gravel roof rejuvenation comprised of a mixture proportioned by volume, and with any one ingredient thereof not exceeding a fifteen percent variation from specified ingredients and measures thereof defined by and proportioned to seventy percent asphalt primer, twenty percent asphalt coating, and ten percent asphalt sealer, each of said asphalt primer, asphalt coating, and asphalt sealer comprising a predetermined individual mixture of asphaltic base material and associated solvent; said asphalt primer comprising a mixture by weight, and with any one ingredient thereof not exceeding a fifteen percent variation from specified ingredients, measures, and properties thereof, defined by and proportioned to fifty percent asphalt base, one hundred percent oxidized, and fifty percent solvent, with said asphalt base properties being:

Softening Point, 140°-160° F.

Penetration at 77° F. of 20-40, and the solvent properties being:

| API Gravity | 55.3 |
|---|---|
| Specific Gravity | .7575 |
| Reed Vapor Pressure | 1.0 psi |
| Flash Point TOC | 115° |
| Boiling Range | 230°-370° F. |
| Chemical Structure: | $C_5H_{12}$ through $C_{10}H_{22}$ straight chain (paraffins), free of aromatics and olefins, 100% saturated molecules, average molecular weight - 114.144. |
| Distillation Data: | Initial Boiling Point 100° F. |

| 5% | 110° | 30% | 270° | 60% | 278° | | |
|---|---|---|---|---|---|---|---|
| 10% | 120° | 40% | 272° | 70% | 282° | 90% | 296° |
| 20% | 268° | 50% | 274° | 80% | 286° | End Point | 354° F.; | said asphalt coating comprising a mixture by weight, and with any one ingredient thereof not exceeding a fifteen percent variation from specified ingredients, measures, and properties thereof defined by and proportioned to sixty-five percent asphalt base and thirty-five percent solvent, with said asphalt base properties being:

Softening Point, 155°-165° F.

Penetration at 77° F. of 30-37 and the solvent properties being as stated above; and said asphalt sealer comprising a mixture of asphaltic base and solvent, with any one ingredient property and mixture property thereof not exceeding fifteen percent variation from specified properties; said asphaltic base comprising Gilsonite Asphalt with a Softening Point of 230° F. and Penetration at 77° F. of 3; said solvent properties being:

| API Gravity | 48.3 |
|---|---|
| Specific Gravity | .7870 |
| Reed Vapor Pressure | 1.3 psi |
| Flash Point TOC | 78° F. |
| Boiling Range | 340°-380° F. |
| Chemical Structure: | $C_9H_{20}$ through $C_{11}H_{24}$, straight chain (paraffins) hydrocarbons, free of aromatics and olefins, 100% saturated molecules, average molecular weight - 142.176. |
| Distillation data: | Initial Boiling Point 320° F. |

| 5% | 338° F. | 30% | 350° F. | 60% | 362° F. | | |
|---|---|---|---|---|---|---|---|
| 10% | 340 | 40% | 354 | 70% | 366 | 90% | 378° F. |
| 20% | 346 | 50% | 358 | 80% | 370 | 100% | 398° F. | and said solvent blended with said Gilsonite asphalt to give a finished asphalt sealer mixture having the following properties:

| Specific Gravity at 60/60° F. | 0.8420 |
|---|---|
| Weight per Gallon | 7.01 lbs. |
| Viscosity at 80° F. (#Ford Cup) | 50.0 sec. |

-continued

| Drying Time | 1 mil dry |
|---|---|
| Dry Touch | 6.0 Min. |
| Dry Tack Free | 15.0 Min. |
| Dry Hard | 24.0 hrs. |
| Non-Volatile | 38%. |

2. The composition of claim 1, with said asphaltic compound mixture proportioned by volume to 72.73 percent of said asphalt primer, 18.18 percent of said asphalt coating, and 9.09 percent of said asphalt sealer.

3. The composition of claim 2, with said asphalt primer comprising a mixture by weight of half of its described asphaltic base and half of its described solvent, and said asphalt coating comprising a mixture by weight of not less than 62 percent and not exceeding 67 percent of its described asphaltic base.

* * * * *